(12) United States Patent
Harris

(10) Patent No.: US 8,823,640 B1
(45) Date of Patent: Sep. 2, 2014

(54) DISPLAY RECONFIGURATION AND EXPANSION ACROSS MULTIPLE DEVICES

(76) Inventor: Scott C. Harris, Rancho Santa Fe, CA (US)

( * ) Notice: Subject to any disclaimer, the term of this patent is extended or adjusted under 35 U.S.C. 154(b) by 125 days.

(21) Appl. No.: 13/274,339

(22) Filed: Oct. 16, 2011

Related U.S. Application Data (60) Provisional application No. 61/405,751, filed on Oct. 22, 2010.

(51) Int. Cl.
*G06F 3/01* (2006.01)

(52) U.S. Cl.
USPC .......................................... 345/156; 345/173

(58) Field of Classification Search
None
See application file for complete search history.

(56) References Cited

U.S. PATENT DOCUMENTS

| | | | |
|---|---|---|---|
| 7,532,196 B2 * | 5/2009 | Hinckley | 345/156 |
| D618,683 S | 6/2010 | Wilson et al. | |
| 8,013,835 B2 * | 9/2011 | Newport et al. | 345/156 |
| 8,427,437 B2 * | 4/2013 | Chae et al. | 345/173 |
| 2005/0093868 A1 * | 5/2005 | Hinckley | 345/502 |
| 2011/0175805 A1 | 7/2011 | Rottler et al. | |
| 2011/0205163 A1 | 8/2011 | Hinckley et al. | |
| 2011/0209039 A1 | 8/2011 | Hinckley et al. | |
| 2011/0209057 A1 | 8/2011 | Hinckley et al. | |
| 2011/0209058 A1 | 8/2011 | Hinckley et al. | |
| 2011/0209089 A1 | 8/2011 | Hinckley et al. | |
| 2011/0209100 A1 | 8/2011 | Hinckley et al. | |
| 2011/0209101 A1 | 8/2011 | Hinckley et al. | |
| 2011/0209102 A1 | 8/2011 | Hinckley et al. | |
| 2011/0209103 A1 | 8/2011 | Hinckley et al. | |
| 2011/0209104 A1 | 8/2011 | Hinckley et al. | |
| 2011/0231296 A1 | 9/2011 | Gross et al. | |

* cited by examiner

*Primary Examiner* — Van Chow
(74) *Attorney, Agent, or Firm* — Law Office of Scott C. Harris, Inc.

(57) ABSTRACT

A computer detects the presence of another computer and automatically extends its display onto the other computer. In one embodiment, the computer is a tablet, and the display of one tablet can be automatically extended on to the display of the other tablet in either of portrait or landscape orientation to make a bigger display from the two tablets together.

20 Claims, 4 Drawing Sheets

DISPLAY RECONFIGURATION AND EXPANSION ACROSS MULTIPLE DEVICES

This application claims priority from provisional application number 61/405,751, filed Oct. 22, 2010, the entire contents of which are herewith incorporated by reference.

BACKGROUND

Different kinds of displays are known. For example, many displays can connect to a computer in order to display the information that has been produced from that computer.

Tablet computers have become popular where the computer is built into the housing behind the display. In these devices, most of the device, e.g., 80% or the area of more of the area of the device is used for display, making the display screen as large as it can practically be. A selectable screen, e.g. a touchscreen, is used to enter commands.

SUMMARY

The present application teaches techniques of reconfiguring and/or expanding displays.

An embodiment teaches reconfiguration of displays in tablet style computers where 50% or more of a surface of a computer forms a display, and where commands can be entered on the display.

DETAILED DESCRIPTION

A tablet style computer is defined according to the present application as being a computer where 50% or more of one surface of the computer forms a display, and where commands can be entered on the display, e.g., by a touch screen.

The inventor recognizes that even though a tablet computer is an all-in-one style computer, that users might still want to supplement the display capability of a tablet computer with other kinds of information. Tablet computers may have output ports such as USB or the like. However, it may be more convenient to use a tablet computer as it was intended: as an all-in-one computer where the computing resources of the tablet are used along with display capabilities of the tablet.

While this embodiment describes operation with a tablet computer (such as an "IPAD" style device), or a tablet portable phone (such as the iphone), the techniques can be applied to other similar devices such as laptops. Moreover, many portable phones, such as the "iPhone" or the Motorola Android phone or Blackberry are in essence a tablet computer, since they operate such that all data is entered on the single front surface. In these phones, most of one surface, e.g., the front of the phone is actually display area and input area. All of the input and output operations are viewed and/or controlled from that display area and input area.

One embodiment describes a way of using multiple tablets together in a way such that the displays of these tablets are extended.

Consider the power and advantages of using two tablets at once. At current, a person buys a computer, e.g., a tablet, and uses that tablet. They can use that tablet to play games, or carry out different functions. They are limited by the size of the tablet, or alternatively, they can attach the tablet to an external display. However, the present embodiments describe ways of allowing two tablets to be used with one another, where the display on one tablet is automatically extended (or in embodiments extended based on certain kinds of commands) onto the display of another tablet. This opens a number of different applications. Users can buy two tablets, with the idea that they will use the two tablets together. This encourages users who already have one tablet to purchase another tablet. When the user has one tablet, they can carry out the operations on that single tablet; however when the user has a second tablet, they can carry out new operations using two different tablets with one display extended onto the other. When two users want to play together, they can put their tablets together, and allow the display from one tablet to extend onto the other, thereby allowing users with multiple tablets to have a collaborative experience where the multiple tablets carry out operations that could not be carried out on a single tablet. This can be done IPAD size tablets of 5 to 7 inches or on cell phone size tablets, for example of just a few inches. All of this is described in the embodiments herein, and in fact certain embodiments describe even further additional advantages.

Figure 1:
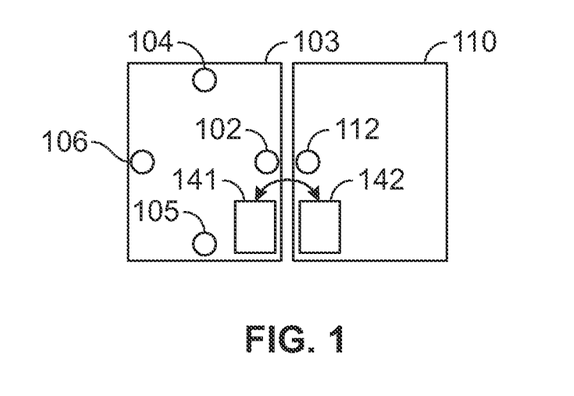
FIG. 1 shows multiple tablets where at least one of them detects the presence of the other.

FIG. 1 shows an embodiment with a first tablet 100 and a second tablet 110. The tablets 100, 110 may be any kind of tablet computer as described herein, or any device which acts like a tablet computer as described herein. For example, as of the writing of this application, exemplary tablet computers may include the Apple "iPad" and the different Android operating system based tablets for example.

In this embodiment, each of the tablets include a detector. The detector 102 is shown in tablet 100 and the detector 112 is shown in tablet 110. These detectors 102, 112 may be located at edges of the tablet or located at any other place in the tablet. In the embodiment of FIG. 1, each of the detectors 102, 112 detect that another tablet is adjacent to the tablet in which the detector is located. For example, detector 102 is located at a location near the edge 103 of tablet unit 100. Detector 112 is located near the edge 113 of tablet unit 110. The detector 102 detects that detector 112 is located near the edge, thereby detecting that two tablets 100, 110 are located edge to edge with one another. Analogously, the detector 112 can sense the proximity of detector 102.

For example, these detectors can be proximity switches, or can be wireless detectors, or magnetic switches that are sensed by the other tablet, or that themselves sense the other tablet. In this embodiment, both the tablets 100, 110 detect the presence of the other, although either tablet detecting the presence of the other can be sufficient.

Note in all the embodiments described throughout this application, the tablets may be shown with small distances between each other. This is intended to emphasize that each of the tablets have separate housings. The intent of this application is that many of these tablets the place up against each other as closely as possible. In operation, the space between the housings may be small or nonexistent.

Figure 2:
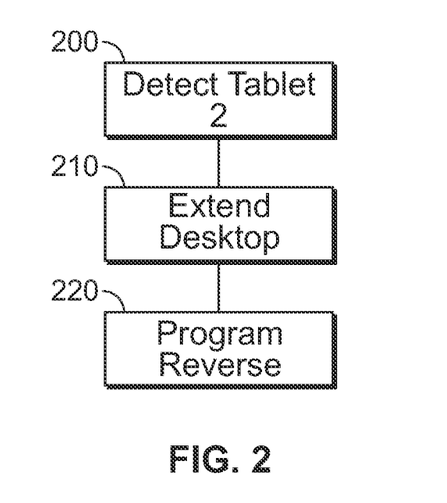
FIG. 2 shows a flowchart run by the tablets.

The detection can operate with either of both tablets running a program shown in the flowchart of FIG. 2.

For the remaining operation, the software will assume that the software is running on tablet 1. However, the software can run on tablet 2 in addition or alternatively.

At 200, the tablet 1 detects tablet 2. If the software is running on tablet 2, then tablet 2 detects tablet 1.

At 210, in response to the tablet 100 detecting tablet 2, the tablet 100 extends its desktop and/or the current running program from tablet 100, across to the other tablet 110. 220 shows in reverse, the display of the second tablet 110 extends backwards to the first tablet 100.

This operation may use, for example, any kind of mediation rule to determine which tablet becomes a master, and which becomes a slave. For example, in one embodiment, the tablet with the lower serial number may automatically become the master. The tablet on the left can automatically become the master. Any other rule can alternatively be used. In an embodiment, the master controls when both the master and the slave are telling the other how to react.

In this embodiment, the tablets determine how to react to actions, based on their position relative to the other tablet. According to an embodiment, the tablet on the left always becomes the master, and the tablet on the right always becomes the slave. This allows the tablet on the left to control the tablet on the right.

In this embodiment, by tracing a circle, or any part of a circular shape, between the two tablets, e.g. using the user's finger on the touch screen, this can command reversal between the master and slave. For example, by tracing the arcuate area 125 between the two tablets, this commands reversing which tablet is the master and which is the slave.

The master may, in this embodiment, run the main program and where the main program extends on to the screen of the slave. In another embodiment, the master shows all the controls for the programs that are displayed jointly on both the master and on the slave.

Throughout all of these embodiments, many operations may be carried out on both tablets as a joint operation between these tablets which can be thought of as a tool housing directed command. The arcuate trace 125 is just one example of these different operations. When such an operation is carried out, the first part of the arcuate trace is detected by the tablet 100. The tablet 100 detects that a master/slave switchover is being commanded from the tablet 100. The tablet 100 then sends information to or requests information from the tablet 110. For example, the message from tablet 100 may indicate that the tablet 100 has received one half of a master slave switchover command, and then queries whether the tablet 110 has received the other half of the switchover commands. This may be done via computer commands, and may be sent via wifi. For example, receiving the first half of the arcuate trace 125 into the tablet computer 100 may set an "enable" to switchover from master to slave. The second half of the arcuate trace into computer 110 may complete the request for switchover, which request will only be granted if the enable has been set by the first half of the trace.

The detectors such as 102, 112 can be at any location along or within the tablet. FIG. 1 shows a detector 102 in the tablet 100, and also shows that the tablet may have detectors at the other edges shown as 104, 105, 106. By putting two tablets together at any of their edges, therefore, the user obtains an extended desktop or tablet area for program display. For example, two rectangular tablets may be placed together to make a display shape that is closer to being square as shown in FIG. 1. A third tablet can also be added at either edge, to provide a more rectangular display.

Figure 3:
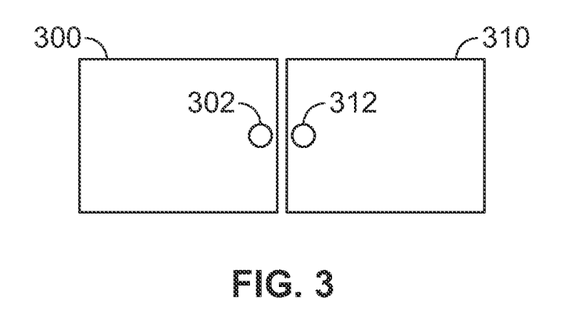
FIG. 3 shows an embodiment where lengthwise orientation is detected.

Because of the different sensors at different edges, the tablets can be placed next to each other in different ways. FIG. 3, for example shows a situation where the detectors 302, 312 on tablets 300 and 310 respectively, detect lengthwise orientation of the two devices 300, 310.

The detectors 302, 312 cause the tablets to be detected and oriented such that both tablets 300, 310 are each in "landscape" mode, where the width of the display is wider than the length. The two tablets next to each other in this configuration creates a long display space with a very wide aspect ratio. Again, this can be used to extend the desktop and/or the usable space of the display.

Figure 4:
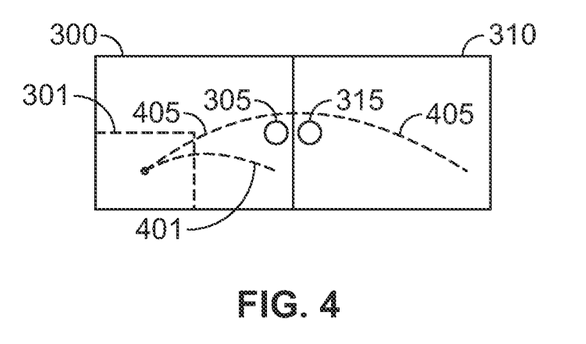
FIG. 4 shows how lengthwise orientation can be used to play a game.

FIG. 4 illustrates how this would be done, for example for playing the game "angry birds". When only one computer is used, the game can be played by firing the birds in the arc 401 that can only extend across the single computer 300 shown in FIG. 4. However, when both computers are placed next to each other, and the desktop is extended from computer 300 on to 310, and the birds can be fired along the arc shown as 405. Note that the line segments forming the arc 405 extends from the screen of the tablet 300 to the screen of the tablet 310. However, other segments of lines can also be extended in this way. For example, taking the example of an item that might be displayed on the screen, such as a tree, the outer perimeter of the tree form a line segment. When the tree is half on one tablet 300 and half of the other tablet 310, the line segment forming that tree can be thought to extend across the tablets. Similarly, when words are being displayed, the line segments defining the words can be extended across the tablet. The term "segment" is used herein to denote items that extend from tablet to tablet, and the line segment need not be a straight line, or even any definable line that can be any pattern that can be formed on one tablet. However, according to an embodiment, the line segment must be continuous. FIG. 4 shows how that line segment 405 is continuous across the junction between the tablets 300, 310.

FIG. 4 shows how the length of the segment can actually be increased when it goes across the tablets, that is the segment 400 within a first distance, but the segment 405, which is the same general envelope shape, is a second distance. As an alternative, however, for example when different kinds of items are being displayed, different information might be set on the second screen 310, while the overall shape of the items on display 300 stay the same.

In this embodiment as shown, the tablet 300 is the master, having the control 301 for playing the game; and the tablet 310 is the slave onto which the display is extended.

This can be used for other games also to create a longer display.

The specific detectors which are found to be adjacent one another can set the display orientation of the tablets. When the detectors 102, 112 are found to be adjacent one another, the tablets are set to portrait orientation next to one another. When the detectors 305, 315 are detected to be adjacent one another (as shown in FIG. 4), the tablets are set to landscape orientation as shown.

The tablets can also be in opposite orientations, with one tablet in portrait, another in landscape, and the sensors being next to one another setting the orientations of the tablets.

In one embodiment, the orientation of the different tablets can be detected via an accelerometer as conventional in certain devices such as the Ipad. The accelerometer produces outputs that inform the computer about its orientation and automatically changes its display based on the orientation.

Figure 5:
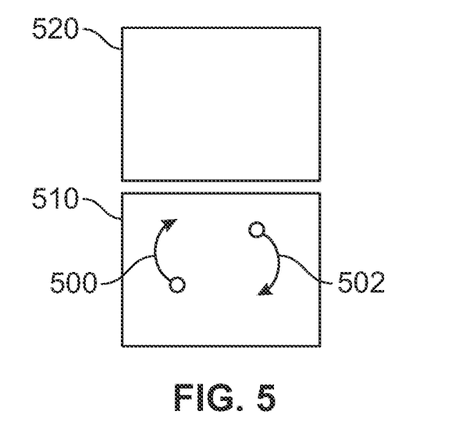
FIG. 5 shows an orientation change command.

In another embodiment, a special command may be executed on the touch screen of the user interfaces of two tablets to inform the devices to change their display orientation. FIG. 5, for example, illustrates one such orientation change command, where the user places two fingers at the locations 500, 502 and then rotates both fingers while they are touching the surface. This commands an orientation change, which automatically changes the orientation by 90°. This can change the orientation on both tablets 510, 520.

The two tablets in FIG. 5 may be rotated to the portrait position by the rotation command shown in FIG. 5.

Figure 6:
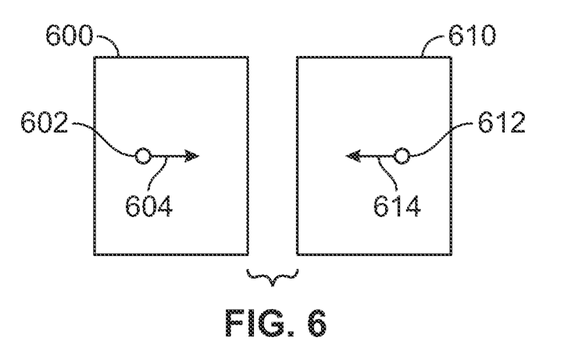
FIG. 6 shows an embodiment in which the user touches multiple tablets to manually command switch over.

FIG. 6 shows an alternative embodiment, where the user touches both tablets at the same time. In this embodiment, instead of automatically detecting that there are two different tablets, the user manually tells the system that there are two different tablets, by placing their fingers on the two tablets 600, 610 at the same time (or one after the other in another embodiment) and moving their fingers towards one another on both tablets, or moving the fingers in the pattern shown in FIG. 5. For example, the users may place their fingers on the tablet 600 at 602 and then move their finger towards the edge across the motion 604.

At the same time or thereafter, the user may put their finger on tablet 610 at location 612 and move their finger in the direction 614. This operation on each of the two tablets instructs each of the two tablets to mate with the other, but does so without requiring a sensor that detects the other tablet.

In this embodiment, the first tablet 600 detects a movement which indicates that the user is requesting to mate with another tablet. The tablet 600 then sends out for example a mate enable request, indicating that the user has requested mating with another tablet. The mate enable request may be sent by Bluetooth or Wi-Fi, or by an optical (e.g. infrared) means. The mate enable request allows any tablet within range to complete the mate request. In this embodiment, the tablet 610 receives the mate enable request from the tablet 600. When the user moves according to the direction 614 in FIG. 6, that completes the mate enable request, thereby causing a mating between the two tablets in FIG. 6. This occurs via one tablet detecting the mate command and telling the other tablet that they have received a command to mate.

Once the tablets have been mated in whatever fashion, both processors in the pair of tablets can be used together, with one processor communicating with the other processor to assign and divide tasks for example. This is shown generally as element 140 in FIG. 1, the where there is wireless communication of data between the processors 141 in tablet 100 and processor 142 in tablet 110. The communication may be carried out using the system's existing wireless capabilities such as Wi-Fi, Bluetooth, optical, or any other conventional wireless format.

In an embodiment, this can use a master/slave configuration, which can be set as described above. Alternatively, the processes can be carried out without selecting master/slave characteristics. The processor that started first, for example, can instruct the other processor what to do.

Figure 7:
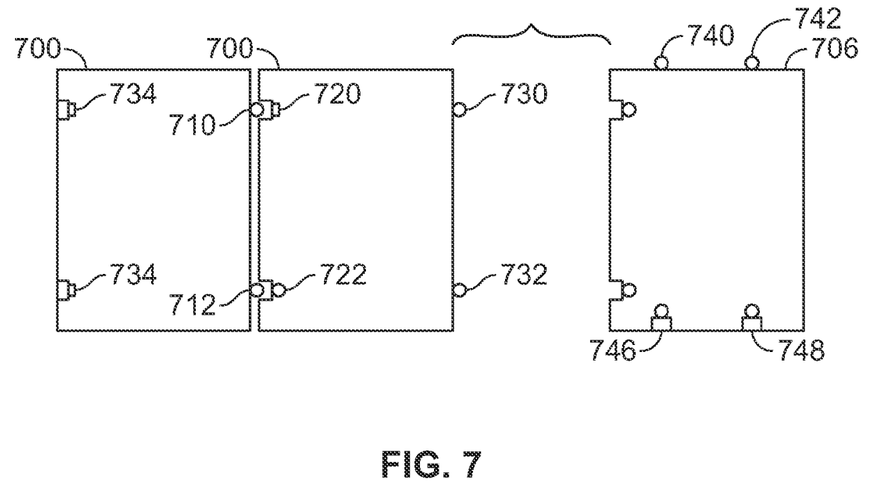
FIG. 7 shows multiple tablets being mated.

In one embodiment, shown in FIG. 7, there can be electrical connectors/connections at the edge points shown as 710, 712. These electrical connectors connect with corresponding electrical connectors on the second tablet 705. By connecting in this way, the tablet has a direct electrical connection to the tablet 705. The electrical connectors may allow data communication therebetween, for example using a USB style format.

In addition, the connectors may allow sharing of battery life between the two tablets, so that the batteries between the two tablets may equalize their voltage and/or charge with one battery which is more charged providing power to the other battery that is less charged. The batteries can equalize their charge over the electrical connectors.

In an embodiment, as shown, the tablets 700 and 705 may all have the same form factor. On the "right" side of the tablet is shown in the configuration of FIG. 7, the contacts 710, 712 may extend outside the outer form factor of the tablet, or alternatively may be extendable based on a control (whereby the contacts are only extendable when the control is activated). On the left side of the tablet, the contacts such as 720, 722 may be indented into the side of the tablet. This may allow the tablets to mate right up against one another, forming a minimum distance in between the abutting tablets, with the extending contacts such as 710 extending into the recessed contact such as 720.

In this embodiment, each of the tablets have the same configuration, with contacts 710, 712 extending or extendable, and two indented contacts 734, 736. The tablet 705 is the same with two recessed contacts 720, 722 and two extending contacts 730, 732. As shown in FIG. 7, additional tablets, such as a third tablet 706 can be connected in an analogous way.

Additional contacts can also be provided, for example there can be an analogous kind of contacts with extending or extendable contacts 740, 742 on the short edge of the tablet and indented contacts 746, 748 on the opposite short edge of the tablet, allowing the tablets to be connected together in the configuration shown in FIG. 4.

The wire connections described in the FIG. 7 embodiment can be used in any of the other embodiments described throughout this specification, as an alternative to the wireless detections.

Figure 8:
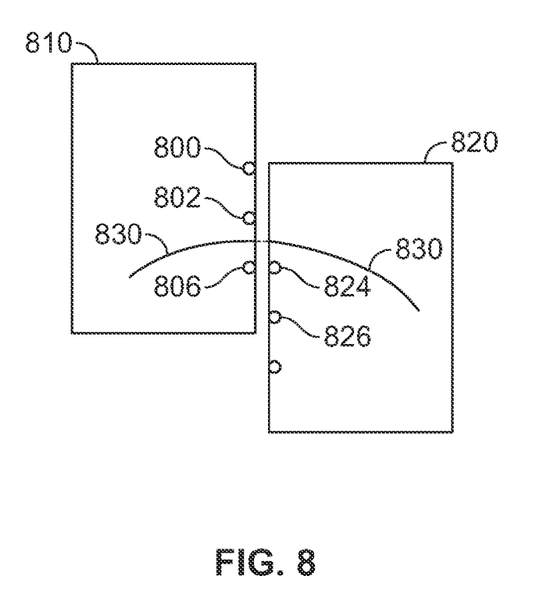
FIG. 8 shows how a line segment can extend across multiple tablets.

In another embodiment, a tablet offset may be detected as shown in FIG. 8. For example, in this embodiment the tablets may have a number of different detectors shown as 800, 802, 804, 806 in tablet 810, with the other tablet 820 having corresponding detectors such as 822, 824, 826, etc. When the tablets are placed next to each other, they automatically detect and offset their respective positions. The offset as detected causes the screens on the tablets to be extended on to one another taking into account the offset between the ways that the tablets were placed adjacent one another.

FIG. 8 shows how an arc of computer operations, such as used by the game angry birds, may extend across the tablets from one display to the other as 830 even when the tablets are offset on relative to the other. The offset may be unintentional or intentional, for example the arc may enable producing a custom shaped desktop or display.

The above embodiments have described tablets being placed right against one another or minimal kinds of distances, with the intent that the tablets be placed up against each other closely e.g. with less than around 0.5 centimeter between them. In another embodiment, there may be spaces between the tablets, while still allowing display expansion between the tablets.

Figure 9:
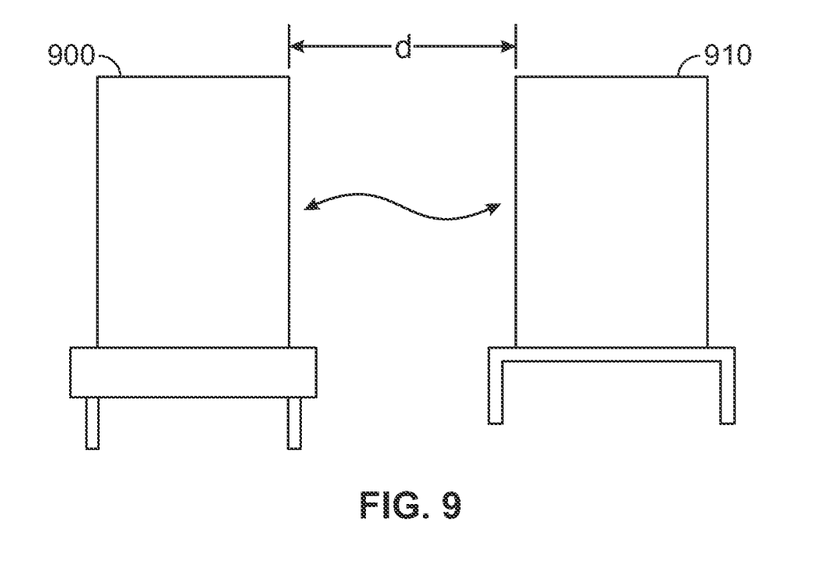
FIG. 9 shows an embodiment in which multiple tablets are distant from one another.

In one embodiment, there may be distances or multiple inches or feet of distance between the tablets. FIG. 9 illustrates a situation where two tablets which are spaced from one another may use an expanded display.

This scenario may be used, for example, when a user owns more than one tablet, and the tablets automatically come into contact with one another when they are within the vicinity of one another. The vicinity detection may cause information to be communicated between the two (or more) tablets, for example, to synchronize certain specified contents of the two tablets. The distance shown as d can be for example between 1 inch and 30 to 40 feet in one embodiment.

For example, when e-mail has been checked on the tablet 900, that same e-mail may be automatically synchronized with the tablet 910. Other contents may also be synchronized. In one embodiment, settings may be set such that when a user plays a video or presentation on tablet 900, that same video or presentation may also be seen on tablet 910. This enables using multiple spaced tablets as a presentation vehicle, since the presentation can be played that automatically synchronizes between the tablets. These two tablets 909, 910 may be tablets whose preferences have automatically been set in advance whereby the tablets have been paired with one another out and their options set to automatically communicate with one another when brought within distance of one another.

Figure 10:
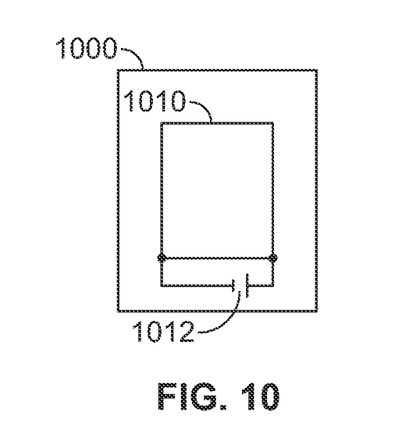
FIG. 10 shows a tablet with a solar cell

Another embodiment shows a specific way of obtaining charge in a tablet computer. FIG. 10 illustrates a tablet computer 1000, which includes a solar cell 1010. The solar cell is placed under the front screen. After a period of inactivity, the screen automatically blanks its display to save power. At that time, the screen is set to transparent, which allows light to penetrate the screen and charge the solar cell 1010, which charges the internal battery 1012 as shown.

In another aspect, a backlight on the screen may also charge the solar cell using the unwanted parts of the backlighting, to in essence recycle some parts of that backlight into charging the battery via the solar cell.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example other kinds of displays and/or computers can be controlled in a similar way to detect adjacent display (s) and automatically extend their display. While the embodiments refer to tablets, it should be understood that computers other than tablets could be accommodated in a similar way. Moreover, certain kinds of portable displays such as on cell phones, remote controls, and the like can be similarly accommodated.

Those of skill would further appreciate that the various illustrative logical blocks, modules, circuits, and algorithm steps described in connection with the embodiments disclosed herein may be implemented as electronic hardware, computer software, or combinations of both. When operated on computer software, the computer software may be embodied on any kind of non-transitory medium, and executed by a processor or any other electronic device. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable computer device, comprising:
housing, holding a processor therein which runs a program that receives inputs and produces outputs, having a first display screen, and where at least some of said outputs are shown on said first display screen, said housing having at least one sensing part, that senses a proximity of another housing holding another processor and having another display screen, and where said processor runs a program from non-transitory storage that runs a program only on said first display screen in a first mode where said proximity of said another housing is not sensed to create a first output, and automatically shows said first output on only said first display screen in said first mode where said proximity of said another housing is not sensed, and to show said first output across both said first display screen and said another display screen of said another housing in a second mode where said proximity of said another housing is sensed, to create an expanded display including at least one line segment which extends from said display to said another display and is continuous across a junction between said display to said another display, and where a same line segment is displayed only on said first display screen when said proximity of said another housing is not sensed, and wherein the processor sets a first narrower aspect ratio for the display when only a single housing is detected, and sets a wider aspect ration for the display when two housings are detected and where the line segment when the two housings are detected extends over a longer distance than the line segment when the two housings are not detected.

2. A device as in claim 1, wherein said housings accept input thereon, and said processor automatically determines if it will become a master processor or a slave processor relative to said another processor, using a mediation rule that is based on a direction in which said input has been received on said housings.

3. The device as in claim 1, wherein said at least one sensing part is a sensor that senses a physical proximity of said another housing wirelessly.

4. A device as in claim 1, wherein said sensing part is a sensor that senses a physical proximity of another housing by an electrical connection between contacts on said housing and contacts on said another housing.

5. The device as in claim 4, wherein said contacts on said housing include first contacts which extended or are extendable, on one side, and second contacts which are indented on an opposite side, and said first contacts mate with second contacts on said another housing.

6. The device as in claim 1, wherein said housing is a housing of a tablet with a touchscreen, and at least one of said inputs is an dual-housing directed input that is partly entered on said touchscreen of said housing and another part of said input is entered on a touchscreen of said another housing.

7. A device as in claim 6, wherein said dual housing directed input is an input that causes actions to be carried out in said processor that assumes similar actions will be carried out in said another processor.

8. A device as in claim 6, wherein said dual housing directed input is a command to carry out an initial mating between the device in said housing, and another device in said another housing.

9. A device as in claim 1, wherein said processor automatically sets an orientation of a device between portrait and landscape based on a location of sensing another device and automatically expands said display in an automatically set orientation.

10. A computer program, stored in a non-transitory medium, and adapted to be executed by a portable computer device, that has a housing, holding a processor therein, having a first display screen, and having at least one sensor which senses another device, said computer program operating to:
receive inputs and produces outputs and produce non transitory signals where at least some of said outputs are shown on said first display screen as a first display;
using said at least one sensor to sense a proximity of another housing holding another processor and having another display, and when said another housing is sensed, automatically expanding said first display produced from said outputs from said first display screen to be displayed on both said first display screen and on said another display of said another housing, to create an expanded display of the same content that was previously displayed on said display to be displayed on both said display and on said another display, and including at least one line segment which extends from said display to said another display and is continuous across a junction between said display and said another display, and wherein the computer program sets a first narrower aspect ratio for the display when only a single housing is detected, and sets a wider aspect ration for the display when two housings are detected and the line segment in when two housings are detected extends over a longer distance than the line segment when a single housing is detected.

11. The program as in claim 10, wherein said housing accepts input thereon, and said computer program further operating to determine if a processor will become a master processor or a slave processor relative to said another processor, using a mediation rule that is based on a direction in which said input has been received on said housings.

12. The program as in claim 10, wherein said using said sensor to sense comprises sensing a physical proximity of said another housing wirelessly.

13. The program as in claim 10, wherein said using said sensor to sense comprises sensing a physical proximity of another housing by an electrically connection between contacts on said housing and contacts on said another housing.

14. The program as in claim 10, wherein at least one of said inputs that is received is a dual-housing directed input that is partly entered on a touchscreen of said housing and another part of said input is entered on a touchscreen of said another housing.

15. The program as in claim 14, wherein said dual housing directed input is a command to carry out an initial mating between a device in said housing, and another device in said another housing.

16. The program as in claim 10, wherein said computer program further operating to set automatically an orientation of a device between portrait and landscape based on a location of sensing another device and automatically expands said display in an automatically set orientation.

17. A method of operating a portable computer device, comprising:
operating a processor in a housing, to run a program from non-transitory medium that receives inputs and produces outputs, and where at least some of said outputs are shown on a first display screen;
using at least one sensing part, that senses a proximity of another housing holding another processor and having another display screen; and
automatically expanding a display produced from said outputs from said first display screen to said another display screen of said another housing, to create an expanded display including at least one line segment which extends from said display to said another display and is continuous across a junction between said display to said another display screen,
said processor operating in a first mode before said another housing has been detected to display said line segment solely on said first display screen, and to run in a second mode after said another housing has been detected to display said line segment extending from said display screen to said another display screen and wherein the processor setting a first narrower aspect ratio for the display when only a single housing is detected, and sets a wider aspect ratio for the display when two housings are detected and the line segment in the second mode extends over a longer distance than the line segment in the first mode.

18. The method as in claim 17, wherein said housing is a housing of a tablet with a touchscreen, and at least one of said inputs is a dual-housing directed input that is partly entered on said touchscreen of said housing and another part of said input is entered on a touchscreen of said another housing.

19. The method as in claim 18, wherein said dual housing directed input is a command to carry out an initial mating between the device in said housing, and another device in said another housing.

20. The method as in claim 17, further comprising automatically setting an orientation of a device between portrait and landscape based on a location of sensing another device and automatically expanding said display in an automatically set orientation.

* * * * *